US011845816B2

(12) United States Patent
Perrot et al.

(10) Patent No.: US 11,845,816 B2
(45) Date of Patent: Dec. 19, 2023

(54) DRAWN ARTICLES OF LOW MTI METALLOCENE POLYPROPYLENE AND PROCESS TO PRODUCE SUCH DRAWN ARTICLES

(71) Applicant: TotalEnergies OneTech Belgium, Seneffe (BE)

(72) Inventors: Manel Perrot, Ecaussinnes (BE); Pieter Geeurickx, Dilbeek (BE)

(73) Assignee: TOTALENERGIES ONETECH BELGIUM, Seneffe (BE)

( * ) Notice: Subject to any disclaimer, the term of this patent is extended or adjusted under 35 U.S.C. 154(b) by 905 days.

(21) Appl. No.: 16/614,411

(22) PCT Filed: May 18, 2018

(86) PCT No.: PCT/EP2018/063122
§ 371 (c)(1),
(2) Date: Nov. 18, 2019

(87) PCT Pub. No.: WO2018/211079
PCT Pub. Date: Nov. 22, 2018

(65) Prior Publication Data
US 2020/0148796 A1    May 14, 2020

(30) Foreign Application Priority Data
May 18, 2017    (EP) ..................................... 17171728

(51) Int. Cl.
| | | |
|---|---|---|
| *C08F 10/06* | (2006.01) | |
| *D01D 5/12* | (2006.01) | |
| *D01D 10/02* | (2006.01) | |
| *D01F 6/06* | (2006.01) | |

(52) U.S. Cl.
CPC ............... *C08F 10/06* (2013.01); *D01D 5/12* (2013.01); *D01D 10/02* (2013.01); *D01F 6/06* (2013.01); *D10B 2321/022* (2013.01)

(58) Field of Classification Search
CPC ......... C08F 10/06; C08F 110/06; D01D 5/12; D01D 10/02; D01F 6/06; D10B 2321/022
See application file for complete search history.

(56) References Cited

U.S. PATENT DOCUMENTS

2003/0236378 A1    12/2003    Ozdemir et al.
2011/0081817 A1*    4/2011    Bieser ..................... B32B 27/32
                                                                    264/210.8

FOREIGN PATENT DOCUMENTS

| EP | 1234837 A1 | 8/2002 |
| EP | 2434037 A1 | 3/2012 |
| WO | 2009103748 A2 | 8/2009 |
| WO | 2011107560 A1 | 9/2011 |
| WO | 2012001160 A2 | 1/2012 |
| WO | 2012020145 A1 | 2/2012 |
| WO | 2013030188 A1 | 3/2013 |
| WO | 2014001425 A1 | 1/2014 |
| WO | 2014001426 A1 | 1/2014 |
| WO | 2014011438 A1 | 1/2014 |

OTHER PUBLICATIONS

International Search Report issued in Application No. PCT/EP2018/063122, dated Jun. 14, 2018, 4 pages.
G.J. Ray et al., "Carbon-13 Nuclear Magnetic Resonance Determination of Monomer Composition and Sequence Distribution in Ethylene-Propylene Copolymers Prepared with a Stereoregular Catalyst System"; Macromolecules, vol. 10, n° 4, 1977, p. 773-778.
Razavi et al., The Geometry of the Site and its Relevance for Chain Migration and Stereospecificity, Macromol. Symp., vol. 89, pp. 345-367, 1995.
Encyclopedic Dictionary of Polymers by Jan W. Gooch, 2007, p. 957.
Polypropylene Handbook, ed. Nello Pasquini, 2nd edition, Hanser, 2005, pp. 397-404.

* cited by examiner

*Primary Examiner* — Elizabeth M Imani
(74) *Attorney, Agent, or Firm* — NORTON ROSE FULBRIGHT US LLP

(57) ABSTRACT

The invention relates to drawn articles selected from fibres, tapes, yarns, staple fibres and continuous filaments, the articles comprising a polypropylene having a melt flow index in the range from 0.1 to 4.9 g/10 min as determined according to ISO 1133, condition L, at 230° C. with a load of 2.16 kg; a xylene soluble fraction of at most 0.8 wt %, relative to the total weight of the polypropylene as determined in accordance with ASTM D542-98; a molecular weight distribution Mw/Mn ranging from 2.0 to 5.0; and a melting temperature Tm of at most 155° C. as determined according to ISO 3146. The invention also relates to the process to produce such drawn articles.

19 Claims, No Drawings

DRAWN ARTICLES OF LOW MTI METALLOCENE POLYPROPYLENE AND PROCESS TO PRODUCE SUCH DRAWN ARTICLES

CROSS-REFERENCE TO RELATED APPLICATIONS

This application claims the benefit of PCT/EP2018/063122 filed May 18, 2018, which claims priority from EP 17171728.3 filed May 18, 2017, which are incorporated herein by reference in their entireties for all purposes.

FIELD OF THE INVENTION

The invention relates generally to drawn articles such as fibres, tapes, yarns, staple fibres and continuous filaments, prepared from polypropylene or polypropylene composition. Particularly, it relates to high-tenacity drawn articles that show an improved balance of elongational and mechanical properties, to processes to produce such articles and to nonwoven and woven comprising such articles.

BACKGROUND OF THE INVENTION

The combination of mechanical and chemical properties together with good processability and good economics have made polypropylene the material of choice for a large number of fibre, tape, nonwoven and woven applications. For instance, it is largely used for articles in construction and in agriculture, sanitary and medical articles, carpets, textiles. In recent years, high-tenacity fibres and nonwoven used for example in geotextiles or in the automotive industry are some of the applications that have attracted special attention.

Depending on the final properties of the fibres, tapes, yarns, staple fibres and continuous filaments, wovens and non-wovens, and of the processing methods used in their production, the requirements on the polypropylene can differ widely. For instance, the polypropylene used for fibres and nonwovens has a melt flow index (MFI) ranging from about 3 to 6 g/10 min for high-tenacity fibres, and up to thousands grams per ten minutes for melt blown nonwovens.

High-tenacity fibres can be produced by melting a polypropylene composition in an extruder and extruding the molten polypropylene through fine capillaries spinneret to obtain filaments. These filaments are then cooled and the solidified fibres are reheated from drawning at elevated temperature (i.e. over 80° C.) and finally annealed. In general, it is observed that the tenacity of the fibres increases by increasing draw ratio. However, the increase in tenacity is accompanied by a decrease in elongational properties. This can lead to fibres having a high tenacity but, because lacking elongational properties, are unable to absorb sufficient energy and therefore tend to break under certain sudden load.

This problem is encountered in particular for the production of geotextiles that requires the nonwoven fabrics comprising such high-tenacity drawn fibres to be needle-punched. There is a need for polypropylene or fibres that allow geotextiles to have a minimal weight with the required mechanical properties. Good elongational properties are required to assure a correct punch-through of the geotextile and to avoid that the fibres break during the needle punching step. Too short fibres lack sufficient entanglement to contribute fully in the geotextile strength. Therefore, there is a need to produce drawn articles, such as fibres, that show high-tenacity properties in combination with high elongational properties.

Thus, it is of interest to propose polypropylenes that allow reaching high tenacity on fibres and tapes, without losing in elongational properties. In other words, there is a need for polypropylenes that allow reaching high tenacity with an improved toughness. The toughness may be expressed by the tensile factor K. Therefore, it could be interesting to propose drawn articles with an improved tensile factor, such as a tensile factor of at least 40 g/denier.

It is also of interest to propose a process to produce drawn articles that are cost-effective.

WO2014/11438 describes drawn fibres made from polypropylene composition comprising a heterophasic propylene copolymer. At a draw ratio of 3 to 5, the fibres show a good balance between tenacity (more than 45 cN/tex) and elongation at break (more than 35%). However, there is a need to further improve the balance of properties.

US2003/0236378 describes a process for producing polypropylene having a high tensile factor. However, this process includes a step of degrading the polypropylene either peroxidically or thermally. This increases the production costs and raises the melt flow index of the polymer.

EP2434037 describes a process for producing polypropylene having a high tensile factor, but with a tenacity of about 25 cN/tex only. It is of interest to have high-tenacity fibres in order to lower the weight of the fabrics such as wovens and nonwovens, which is advantageous for economic and environmental reasons.

SUMMARY OF THE INVENTION

The invention aims to solve at least one of the problems encountered in prior art.

According to a first aspect, the invention relates to a drawn article selected from fibre, yarn tape, staple fibre and continuous filament, the article comprising a polypropylene, wherein the polypropylene has:
- a melt flow index in the range from 0.1 to 4.9 g/10 min as determined according to ISO 1133, condition L, at 230° C. with a load of 2.16 kg;
- a xylene soluble fraction of at most 0.8 wt %, relative to the total weight of the polypropylene as determined in accordance with ASTM D542-98;
- a molecular weight distribution Mw/Mn ranging from 2.0 to 5.0; and
- a melting temperature Tm of at most 155° C. as determined according to ISO 3146.

Surprisingly, it has been found by the inventors that it was possible to produce drawn articles with high tenacity, good elongational properties and improved toughness with said polypropylene. In addition, to improve the targeted properties, the inventors found a cost-effective process, using specific catalysts, to produce such articles wherein the polymer is not degraded after polymerisation and wherein the overall production costs are reduced.

With preference the drawn article has one or more of the following properties, when drawn to a ratio ranging from 2 to 12, preferably when drawn to a ratio ranging from 2.5 to 12:
- a tenacity of at least 45 cN/tex as determined on a Lenzing Vibrodyn according to norm ISO 5079:1995 with a testing speed of 10 mm/min at 23° C. and gauge length of 10 mm.
- a tenacity of at least 50 cN/tex as determined on a Lenzing Vibrodyn according to norm ISO 5079:1995 with a testing speed of 10 mm/min at 23° C. and gauge length of 10 mm at a draw ratio ranging from 5 to 7.

an elongation a break of at least 30% as determined on a Lenzing Vibrodyn according to norm ISO 5079:1995 with a testing speed of 10 mm/min at 23° C. and gauge length of 10 mm.

an elongation a break of at least 42% as determined on a Lenzing Vibrodyn according to norm ISO 5079:1995 with a testing speed of 10 mm/min at 23° C. and gauge length of 10 mm at a draw ratio ranging from 5 to 7.

a tensile factor K of at least 40 g/denier, wherein the tensile factor is determined by formula (2):

$$K = Ten \times Elong^{1/2} \quad (2)$$

wherein Ten is the tenacity at max expressed in g/den, and Elong is elongation at max expressed in %, and wherein Ten and Elong are both determined on a Lenzing Vibrodyn according to norm ISO 5079:1995 with a testing speed of 10 mm/min at 23° C. and gauge length of 10 mm.

With preference, one or more of the following features can be used to further define the polypropylene comprised in the drawn article:

The polypropylene is a homopolymer of propylene.

The polypropylene has a xylene soluble fraction of at most 0.6 wt %, relative to the total weight of the polypropylene as determined in accordance with ASTM D542-98, preferably of at most 0.5 wt %.

The polypropylene has a melt flow index of at most 4.8 g/10 min, preferably of at most 4.5 g/10 min; and/or of at least 0.8 g/10 min, and most preferably of at least 1.0 g/10 min as measured according to ISO 1133 at 230° C. under a load of 2.16 kg. The value of MFI of the polypropylene is obtained without a degradation treatment.

The polypropylene has a molecular weight distribution of at most 3.5, preferably of at most 3.0.

The polypropylene has a melting temperature of at most 153° C. as determined according to ISO 3146.

With preference, one or more of the following features can be used to define the drawn article:

The article is drawn at a draw ratio ranging from 2 to 12, preferably from 2.5 to 12, more preferably from 4 to 8 and even more preferably from 5 to 7, or from 2 to 7.

The drawn article comprises a polypropylene produced by polymerization of propylene monomer and one or more optional comonomers in presence of a metallocene catalyst of the formula:

$$(Ind)_2 R^1 MQ_2 \quad (1)$$

wherein:
each Ind is the same and is a substituted or unsubstituted indenyl group;

$R^1$ is a structural bridge imparting stereorigidity to the component and is selected from —$(CR^2R^3)_p$— or —$(SiR^2R^3)_p$— with p=1 or 2, preferably it is —$(SiR^2R^3)$—;

$R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;

$R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring; preferably, $R^3$ is a $C_5$-$C_7$ cyclocarbyl M is selected from Ti, Zr, or Hf;

Q is an hydrocarbyl radical such as an alkyl, aryl, alkenyl, alkylaryl, or arylalkyl radical having 1-20 carbon atoms or is a halogen.

With preference, each Ind is the same and is a 4-hydrocarbyl-substituted indenyl group.

With preference $R^1$ is a structural bridge imparting stereorigidity to the component and is —$(SiR^2R^3)_p$— with p=1. Thus, in an embodiment, the drawn article comprises a polypropylene produced by polymerization of propylene monomer and one or more optional comonomers in presence of a metallocene catalyst of the formula:

$$(Ind)_2 R^1 MQ_2 \quad (1)$$

wherein:
each Ind is the same and is a 4-hydrocarbyl-substituted indenyl group;

$R^1$ is a structural bridge imparting stereorigidity to the component and is —$(SiR^2R^3)_p$— with p=1;

$R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;

$R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring; preferably, $R^3$ is a $C_5$-$C_7$ cyclocarbyl M is selected from Ti, Zr, or Hf;

Q is an hydrocarbyl radical such as an alkyl, aryl, alkenyl, alkylaryl, or arylalkyl radical having 1-20 carbon atoms or is a halogen.

According to a second aspect, the invention relates to woven and nonwoven comprising the drawn article as defined above.

According to a third aspect, the invention is directed to a process for the production of drawn articles as defined before, wherein the process comprises the step of:

(a) producing a polypropylene by polymerization of propylene and one or more optional comonomers in presence of a single-site catalyst, preferably metallocene catalyst, of the following formula:

$$(Ind)_2 R^1 MQ_2 \quad (1)$$

wherein:
each Ind is the same and is a substituted or unsubstituted indenyl group;

$R^1$ is a structural bridge imparting stereorigidity to the component and is selected from —$(CR^2R^3)_p$— or —$(SiR^2R^3)_p$— with p=1 or 2, preferably it is —$(SiR^2R^3)$—;

$R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;

$R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring; preferably, $R^3$ is a $C_5$-$C_7$ cyclocarbyl;

M is selected from Ti, Zr, or Hf;

Q is an hydrocarbyl radical such as an alkyl, aryl, alkenyl, alkylaryl, or arylalkyl radical having 1-20 carbon atoms or is a halogen.

With preference, each Ind is the same and is a 4-hydrocarbyl-substituted indenyl group.

With preference $R^1$ is a structural bridge imparting stereorigidity to the component and is —$(SiR^2R^3)_p$— with p=1.

Thus, with preference, the metallocene catalyst is of the formula:

wherein:
- each Ind is the same and is a 4-hydrocarbyl-substituted indenyl group;
- $R^1$ is a structural bridge imparting stereorigidity to the component and is —$(SiR^2R^3)_p$— with p=1;
- $R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;
- $R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring; preferably, $R^3$ is a $C_5$-$C_7$ cyclocarbyl;
- M is selected from Ti, Zr, or Hf;
- Q is an hydrocarbyl radical such as an alkyl, aryl, alkenyl, alkylaryl, or arylalkyl radical having 1-20 carbon atoms or is a halogen.

More preferably, the catalyst is $(C_6H_{11})(CH_3)Si(2\text{-Me-}4\text{-}(4'tBuPh)Ind)_2ZrCl_2$. In an embodiment, the polymerisation of step (a) is performed in presence of one or more co-catalysts capable of activating the metallocene catalyst of formula (1). Useful co-catalysts may be selected from alumoxane or ionic activators. Preferably, the co-catalyst is an ionic activator. In an embodiment, the co-catalyst is an alumoxane selected from methylalumoxane, modified methyl alumoxane, ethylalumoxane, isobutylalumoxane, or any combination thereof. Preferably, the co-catalyst is methylalumoxane (MAO).

Preferably, the polymerization reaction of step (a) is performed in presence of one or more co-activators being trialkyl aluminium selected from Tri-Ethyl Aluminum (TEAL), Tri-Iso-Butyl Aluminum (TIBAL), Tri-Methyl Aluminum (TMA), and Methyl-Methyl-Ethyl Aluminum (MMEAL) or any mixture thereof, more preferably the co-activator is Tri-iso-Butyl Aluminum (TIBAL).

With preference, the process further comprises the steps of:
(b) extruding the polypropylene produced in step (a) to form an article selected from fibre, yarn, tape, staple fibre and continuous filament, and cooling the article;
(c) drawing the article of step (b) at a draw ratio ranging from 2 to 12;
(d) optionally annealing the drawn article obtained in step (c).

In an embodiment, the step (b) of extrusion is performed at a temperature ranging from 200 to 300° C., more preferably from 220 to 280° C.

In an embodiment, the step (c) of drawing the article comprises reheating the article of step (b) at a temperature ranging from 80 to 140° C.

In an embodiment, the step (c) comprises drawing the article of step (b) at a draw ratio ranging from 2.5 to 12, preferably ranging from 3 to 10, more preferably 4 to 8 and even more preferably ranging from 5 to 7, or from 2 to 7 for a drawn article selected from fibre, yarn, continuous filament and tape.

In an embodiment, the step (c) comprises drawing the article of step (b) at a draw ratio ranging from 2 to 5, preferably ranging from 2 to 4 for a drawn article being a staple fibre produced according to a short spin process.

Surprisingly, in addition of allowing to produce drawn articles with an improved balance of tenacity and elongational properties, the inventors have demonstrated that the process of the invention is cost-effective as the activity of the catalyst during the polymerization step is enhanced compared to other metallocene catalysts, as demonstrated in the examples.

According to a fourth aspect, the invention also relates to the use of a single site catalyst, preferably a metallocene catalyst, of the following formula:

wherein:
- each Ind is the same and is a substituted or unsubstituted indenyl group;
- $R^1$ is a structural bridge imparting stereorigidity to the component and is selected from —$(CR^2R^3)_p$— or —$(SiR^2R^3)_p$— with p=1 or 2, preferably it is —$(SiR^2R^3)$—;
- $R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;
- $R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring; preferably, $R^3$ is a $C_5$-$C_7$ cyclocarbyl;
- M is selected from Ti, Zr, or Hf;
- Q is an hydrocarbyl radical such as an alkyl, aryl, alkenyl, alkylaryl, or arylalkyl radical having 1-20 carbon atoms or is a halogen as a catalyst to produce drawn article selected from fibre, yarn, tape, staple fibre and continuous filament made from polypropylene.

With preference, each Ind is the same and is a 4-hydrocarbyl-substituted indenyl group.

With preference $R^1$ is a structural bridge imparting stereorigidity to the component and is —$(SiR^2R^3)_p$— with p=1.

Thus, with preference, the metallocene catalyst is of the formula:

wherein:
- each Ind is the same and is a 4-hydrocarbyl-substituted indenyl group;
- $R^1$ is a structural bridge imparting stereorigidity to the component and is —$(SiR^2R^3)_p$— with p=1;
- $R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;
- $R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring; preferably, $R^3$ is a $C_5$-$C_7$ cyclocarbyl;

M is selected from Ti, Zr, or Hf;

Q is an hydrocarbyl radical such as an alkyl, aryl, alkenyl, alkylaryl, or arylalkyl radical having 1-20 carbon atoms or is a halogen.

In a preferred embodiment, the invention relates to the use of $(C_6H_{11})(CH_3)Si(2$-Me-4-(4'BuPh)Ind$)_2ZrCl_2$ as a catalyst to produce drawn article selected from fibre, yarn, tape, staple fibre and continuous filament made from polypropylene.

In all aspects, the drawn article is selected from fibre, yarn, tape, staple fibre and continuous filament. In a preferred embodiment, it is selected from fibre, yarn and tape. In another preferred embodiment, it is selected from staple fibre and continuous filament.

DETAILED DESCRIPTION OF THE INVENTION

For the purpose of the invention the following definitions are given:

As used herein, a "polymer" is a polymeric compound prepared by polymerising monomers, whether of the same or of a different type. The generic term polymer thus embraces the term homopolymer, usually employed to refer to polymers prepared from only one type of monomer, and the terms copolymer and interpolymer as defined below.

As used herein, a "copolymer", "interpolymer" and like terms mean a polymer prepared by the polymerisation of at least two different types of monomers. These generic terms include polymers prepared from two or more different types of monomers, i.e. terpolymers, tetrapolymers, etc.

For the purpose of the invention, the terms "polypropylene" and "propylene polymer" may be used synonymously. The term "metallocene polypropylene" is used to denote a polypropylene produced with a metallocene-based polymerization catalyst, the produced "metallocene polypropylene" will be labelled "mPP".

The term "polypropylene" or "polypropylene resin" as used herein refers to the polypropylene fluff or powder that is extruded, and/or melted and/or pelletized, for instance with mixing and/or extruder equipment. The term "fluff" or "powder" as used herein refers to the polypropylene material with the hard catalyst particle at the core of each grain and is defined as the polymer material after it exits the polymerization reactor (or final polymerization reactor in the case of multiple reactors connected in series).

For any particular compound disclosed herein, any general or presented structure presented also encompasses all conformational isomers, regioisomers, and stereoisomers that may arise from a particular set of substituents. The general or specific structure also encompasses all enantiomers, diastereomers, and other optical isomers whether in enantiomeric or racemic forms, as well as mixtures of stereoisomers, as would be recognized by a person skilled in the art.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

The particular features, structures, characteristics or embodiments may be combined in any suitable manner, as it would be apparent to a person skilled in the art from this disclosure, in one or more embodiments.

The invention provides a low MFI single-site catalyzed isotactic polypropylene that is particularly useful for the production of fibres and tapes. The invention also provides a method of production of such a polypropylene that allows obtaining an improved balance of tenacity and elongational properties.

The Polypropylene

The polypropylene of the invention is characterized by an isotacticity for which the content of mmmm pentads is a measure. Preferably, the content of mmmm pentads polypropylene has a content of mmmm pentads of at least 90% as determined by $^{13}$C-NMR analysis, preferably at least 95% more preferably at least 98% and even more preferably of at least 99%. The isotacticity may be determined by $^{13}$C-NMR analysis as described in the test methods.

In the preparation of the polypropylene, a certain amount of atactic polymer may be produced. This atactic polymer is soluble in xylene and is thus named the xylene soluble fraction (XS %). The xylene soluble fraction is indicative of the extent of the crystalline polymer formed. In an embodiment, the polypropylene of the invention has a xylene soluble fraction of at most 1.0 wt %, preferably of at most 0.8 wt % more preferably of at most 0.6 wt %, and even more preferably of at most 0.5 wt %, as relative to the total weight of the polypropylene. The xylene solubles fraction is determined in accordance with ASTM D542-98.

Preferably, the polypropylene is characterized by a percentage of 2,1-insertions, relative to the total number of propylene molecules in the polymer chain, of at least 0.1 mol %, preferably at least 0.2 mol %.

Preferably, the polypropylene is further characterized by a percentage of 2,1-insertions, relative to the total number of propylene molecules in the polymer chain, of at most 1.5 mol %, more preferably of at most 1.3 mol %. The percentage of 2,1-insertions may be determined as indicated in the test methods.

The polypropylene has a melt flow index (MFI) ranging from 0.1 to 5.0 g/10 min, preferably 0.5 to 4.9 g/10 min.

More preferably, the mPP has a melt flow index (MFI) of at least 0.1 g/10 min, preferably of at least 0.5 g/10 min, more preferably of at least 0.8 g/10 min, even more preferably of at least 1.0 g/10 min, most preferably of at least 1.2 g/10 min, and even most preferably of at least 1.5 g/10 min as measured according to ISO 1133 at 230° C. under a load of 2.16 kg. The value of MFI of the polypropylene is obtained without a degradation treatment.

In an embodiment, the mPP has a melt flow index (MFI) of at most 5.0 g/10 min, preferably of at most 4.9 g/10 min, more preferably of at most 4.8 g/10 min, and most preferably of at most 4.5 g/10 min as measured according to ISO 1133 at 230° C. under a load of 2.16 kg. The value of MFI of the polypropylene is obtained without a degradation treatment.

Preferably, the polypropylene has a molecular weight distribution (MWD), defined as Mw/Mn, i.e. the ratio of weight average molecular weight (Mw) over number average molecular weight (Mn), of at most 5.0, preferably of at most 4.0, more preferably of at most 3.5, even more preferably of at most 3.0, and most preferably of at most 2.9;

and/or of at least 2.0, preferably of at least 2.1, more preferably of at least 2.3, even more preferably of at least 2.5.

The molecular weight distribution (MWD) of the propylene polymer may be monomodal or multimodal, for example bimodal. A multimodal molecular weight distribution is obtained by combining at least two propylene polymers having different melt flow indices. The polypropylene may be monomodal or multimodal. With preference, the propylene polymer has a monomodal molecular weight distribution.

Preferably, the polypropylene has a melting temperature of at most 155° C., preferably of at most 153° C. The melting temperature is determined according to ISO 3146.

The polypropylene is a homopolymer, a copolymer of propylene and at least one comonomer, or a mixture thereof. Suitable comonomers can be selected from the group consisting of ethylene and aliphatic $C_4$-$C_{20}$ alpha-olefins. Examples of suitable aliphatic $C_4$-$C_{20}$ alpha-olefins include 1-butene, 1-pentene, 4-methyl-1-pentene, 1-hexene, 1-octene, 1-decene, 1-dodecene, 1-tetradecene, 1-hexadecene, 1-octadecene and 1-eicosene. Preferably, the comonomer is ethylene or 1-hexene. More preferably, the comonomer is ethylene.

In a preferred embodiment of the invention, the polypropylene is a homopolymer of propylene. A homopolymer according to this invention has less than 0.1 wt %, preferably less than 0.05 wt % and more preferably less than 0.005 wt % of ethylene and aliphatic $C_4$-$C_{20}$ alpha-olefins in the polymer, as based on the total weight of the polypropylene. Most preferred, no alpha-olefins, other than propylene, are detectable.

In an embodiment, the propylene polymer is a propylene copolymer. The propylene copolymer can be a random copolymer, a heterophasic copolymer, or a mixture thereof.

The random propylene copolymer comprises at least 0.1 wt % of one or more comonomers, preferably at least 1 wt %. The random propylene copolymer comprises up to 10 wt % of one or more comonomers and most preferably up to 6 wt %. Preferably, the random copolymer is a copolymer of propylene and ethylene.

The heterophasic copolymer of propylene comprises a dispersed phase, generally constituted by an elastomeric ethylene-propylene copolymer (for example EPR), distributed inside a semi-crystalline polypropylene matrix being a homopolymer of propylene or a random propylene copolymer.

With preference, the polypropylene is a homopolymer, a random copolymer of propylene and at least one comonomer or a mixture thereof. Preferably, the polypropylene is not and/or does not comprise a terpolymer.

The invention also encompasses polypropylene compositions comprising the polypropylene as defined above.

Preferably, the polymerisation of the propylene and one or more optional comonomers is performed in the presence of one or more metallocene-based catalytic systems comprising one or more metallocene components, a support and an activating agent.

Polymerization of the Polypropylene

The polypropylene resin is preferably prepared in a reactor, either in gas phase, in bulk, in solution or in slurry conditions. Preferably, said polypropylene is prepared under bulk conditions. In a preferred embodiment, the polypropylene is produced in a loop reactor that comprises interconnected pipes defining a reactor path and wherein liquid propylene is injected. Preferably, the polypropylene resin is produced in a double loop reactor, comprising two loop reactors connected in series.

As used herein the term "polymerisation slurry" or "polymer slurry" or "slurry" means substantially a multi-phase composition including at least polymer solids and a liquid phase, wherein the liquid is the continuous phase. The solids include catalyst and a polymerised olefin, such as polypropylene. The liquid includes an inert diluent such as isobutane, dissolved monomer(s) such as propylene, optional comonomer(s), molecular weight control agents such as hydrogen, antistatic agents, antifouling agents, scavengers and other process additives.

The single-site catalyst-based catalytic systems are known to the person skilled in the art. Amongst these catalysts, metallocenes are preferred. The metallocene catalysts are compounds of Group IV transition metals of the Periodic Table such as titanium, zirconium, hafnium, etc., and have a coordinated structure with a metal compound and a ligand composed of one or two groups of cyclopentadienyl, indenyl, fluorenyl or their derivatives. The use of metallocene catalysts in the polymerisation of olefins has various advantages. Metallocene catalysts have high activities and are capable of preparing polymers with enhanced physical properties.

The polypropylene contemplated is produced by a single-site catalyst, preferably a metallocene catalyst, of the following formula:

$$(\text{Ind})_2 R^1 M Q_2 \qquad (1)$$

wherein:
  each Ind is the same and is a substituted or unsubstituted indenyl group;
  $R^1$ is a structural bridge imparting stereorigidity to the component and is selected from —$(CR^2R^3)_p$— or —$(SiR^2R^3)_p$— with p=1 or 2, preferably it is —$(SiR^2R^3)$—; —$R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;
  $R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring; preferably, $R^3$ is a $C_5$-$C_7$ cyclocarbyl;
  M is selected from Ti, Zr, or Hf;
  Q is an hydrocarbyl radical such as an alkyl, aryl, alkenyl, alkylaryl, or arylalkyl radical having 1-20 carbon atoms or is a halogen.

With preference, each Ind is the same and is a 4-hydrocarbyl-substituted indenyl group.

With preference $R^1$ is a structural bridge imparting stereorigidity to the component and is —$(SiR^2R^3)_p$— with p=1.

Thus, in an embodiment, the single-site catalyst, preferably metallocene catalyst, is of the formula:

$$(\text{Ind})_2 R^1 M Q_2 \qquad (1)$$

wherein:
  each Ind is the same and is a 4-hydrocarbyl-substituted indenyl group;
  $R^1$ is a structural bridge imparting stereorigidity to the component and is —$(SiR^2R^3)_p$— with p=1;
  $R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;

$R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring; preferably, $R^3$ is a $C_5$-$C_7$ cyclocarbyl;

M is selected from Ti, Zr, or Hf;

Q is an hydrocarbyl radical such as an alkyl, aryl, alkenyl, alkylaryl, or arylalkyl radical having 1-20 carbon atoms or is a halogen.

More preferably, the catalyst is $(C_6H_{11})(CH_3)Si(2$-Me-4-(4'tBuPh)Ind$)_2ZrCl_2$. Indeed, surprisingly, it has been found by the inventors that such catalysts produce a polypropylene that allows obtaining an improved balance of elongational and mechanical properties on drawn fibres, yarns, yarns, staple fibres and continuous filaments produced from said polypropylene than from other metallocene catalysts as it will be demonstrated in the examples. In addition, said catalyst shows a higher activity resulting in a significant reduction of the production costs of the polypropylene.

The metallocene may be supported according to any method known in the art. In the event it is supported, the support used in the present invention can be any organic or inorganic solid, particularly a porous support such as silica, talc, inorganic oxides, and resinous support material such as polyolefin. Preferably, the support material is an inorganic oxide in its finely divided form. Supported catalyst can be prepared in accordance with WO2011107560, WO2012001160 or WO2012020145 which are incorporated by reference.

The polymerisation of propylene and one or more optional comonomers in the presence of a metallocene-based catalytic system can be carried out according to known techniques in one or more polymerisation reactors. The metallocene polypropylene is preferably produced by polymerisation in liquid propylene at temperatures in the range from 20° C. to 100° C. Preferably, temperatures are in the range from 60° C. to 80° C. The pressure can be atmospheric or higher. It is preferably between 25 and 50 bar. The molecular weight of the polymer chains, and in consequence the melt flow of the metallocene polypropylene, is mainly regulated by the addition of hydrogen to the polymerisation medium.

In an embodiment, the polymerisation reaction is performed in presence of one or more co-catalysts capable of activating the metallocene catalyst of formula (1). Useful co-catalysts may be selected from alumoxane or ionic activators. Preferably, the co-catalyst is an ionic activator. In an embodiment, the co-catalyst is an alumoxane selected from methylalumoxane, modified methyl alumoxane, ethylalumoxane, isobutylalumoxane, or any combination thereof. Preferably, the co-catalyst is methylalumoxane (MAO).

With preference, the polymerization reaction is performed in presence of a co-activator being a trialkyl aluminium selected from Tri-Ethyl Aluminum (TEAL), Tri-iso-Butyl Aluminum (TIBAL), Tri-Methyl Aluminum (TMA), and Methyl-Methyl-Ethyl Aluminum (MMEAL), more preferably the co-activator is Tri-iso-Butyl Aluminum (TIBAL).

Preferably, the metallocene polypropylene is recovered from the one or more polymerisation reactors without post-polymerisation treatment to reduce its molecular weight and/or narrow its molecular weight distribution, such as it can be done by thermal or chemical degradation. An example of chemical degradation is visbreaking, wherein the isotactic polypropylene is reacted for example with an organic peroxide at elevated temperatures, for example in an extruder or pelletizing equipment.

Fibres, Yarns, Tapes, Staple Fibres and Continuous Filaments

The polypropylene of the invention is advantageously used to produce fibres, yarns and tapes for application such as wovens and nonwovens for geotextiles, or to produce staple fibres and continuous filaments.

The process to produce the drawn article from the polypropylene of the invention is as follows:

(b) extruding the polypropylene produced in step (a) to form an article selected from fibre, yarn, tape, staple fibre and continuous filament, and cooling the article;

(c) drawing the article of step (b) at a draw ratio ranging from 2 to 12;

(d) optionally annealing the drawn article obtained in step (c).

In an embodiment, the step (b) of extrusion is performed at a temperature ranging from 200 to 300° C., more preferably from 220 to 280° C.

In an embodiment, the step (c) of drawing the article comprises reheating the article of step (b) at a temperature ranging from 80 to 140° C.

In an embodiment, the step (c) comprises drawing the article of step (b) at a draw ratio ranging from 2.5 to 12, preferably ranging from 3 to 10, more preferably 4 to 8 and even more preferably ranging from 5 to 7 or from 2 to 7 for a drawn article selected from fibre, yarn, continuous filament and tape.

In an embodiment, the step (c) comprises drawing the article of step (b) at a draw ratio ranging from 2 to 5, preferably ranging from 2 to 4 for a drawn article being a staple fibre produced according to a short spin process.

The polypropylene produced by the process and catalyst of the present invention is used to produce fibres, tapes, yarns, staple fibres and continuous filaments. In particular, it is used to produce staple fibres and high-tenacity yarns. These may, in turn, be used in the manufacture of nonwovens or of wovens. The methods used in the production of the fibres, tapes, yarns, staple fibres and continuous filaments as well as the nonwovens are for example described in Polypropylene Handbook, ed. Nello Pasquini, 2nd edition, Hanser, 2005, pages 397-404.

The polypropylene is melted in an extruder, optionally passed through a melt pump to ensure a constant feeding rate, and then extruded through a number of fine capillaries of a spinneret, thus obtaining molten fibres. Subsequently, they are solidified. Preferably, the solidified fibres are reheated to a temperature of 130° C. or less, drawn to a draw ratio of at least 2, and then annealed. In a preferred mode, the annealed fibres are cut to a length in the range from 1.5 mm to 200 mm, preferably in the range from 10 mm to 100 mm.

Such "cut fibres" are generally referred to as "staple fibres". Staple fibres, in general, are produced either by the traditional spinning process or the compact spinning process. In the traditional spinning process, staple fibres are produced in two steps. The first step includes fibre production, application of a spin finish to give certain desired properties to the fibres and winding the undrawn fibre bundle or tow. The second step includes drawing of the fibres, optional application of a second spin finish, optional crimping or texturizing and cutting into staple fibres.

The compact spinning process, also called short spin process, is a one-step process, wherein fibre extrusion, drawing, and optional crimping or texturizing are performed in a single step, at low spinning speed (take-up speed typically <250 m/min) and with a high number of filaments per die plate (typically >1.000). The staple fibres produced in accordance with the present invention may subsequently be used to produce nonwovens.

Preferably, the production of nonwovens comprises the steps of carding, thus forming a web, which is then passed through a bonding step. Bonding of the web may be accomplished by thermobonding, hydroentanglement, needle punching, or chemical bonding. For geotextiles and nonwovens for automotive applications, needle punching is preferred. The nonwovens of the invention are preferably geotextiles and nonwovens for automotive applications.

The following process can be used to manufacture tapes which comprises the steps of:
  b) providing polypropylene produced in step (a);
  c) forming the polypropylene of step a) into a film; and
  d) slitting the film of step b) into tapes; preferably wherein said film is slit in tapes having a titer from at least 100 dTex to at most 1500 dTex.

As indicated above, one of the steps of a process according to the invention can involve the formation of the polypropylene into a film or sheet. Throughout the present application the terms "forming" and "shaping" may be used synonymously.

Such film (or sheet) may be prepared by any conventional film formation process including extrusion procedures, such as cast film or blown film extrusion, lamination processes or any combination thereof. The film may be a monolayer or multilayer film, e.g. a coextruded multilayer film. In the case of a multilayer film, preferably, the film layers may comprise the same or different polymer composition, whereby at least one layer comprises the polypropylene as defined herein. Preferably, all layers of a multilayer film comprise, more preferably consist of, a polypropylene as defined herein. In some embodiments all layers of a multilayer film comprise, more preferably consist of, the same polypropylene as defined herein.

Any known film blowing line equipment can be used to prepare blown films, for example Macchia's COEX FLEX®. The process parameters which can be used are well-known to the person skilled in the art depending on the desired application of the film. For example: The die diameter can vary from 50 to 2000 mm. The blow-up ratio (BUR) can be of 1 to 5. The die-gap can be of 0.8 to 2.6 mm. The throughput can be of 10 kg/h to 2000 kg/h. The extrusion screw can have a diameter of from 30 mm to 150 mm. Preferably, the screw is a barrier screw. Typical cast film equipment can be provided by Dolci, SML etc. Again, the skilled person would know how to run the cast film line to obtain the best possible results.

In some embodiments, the tapes are in stretched, i.e. oriented, form. Preferably tapes are stretched uniaxially, more preferably in the machine direction (MD). When a film is first formed and cut to tapes, said film can be stretched before cutting to stretched tapes, or the film is first cut and then the formed tapes are stretched to form final stretched tapes. Preferably the film is first cut to tapes which are then stretched to a desired draw ratio to form final tapes. As to preparation of tapes by first forming a film and cutting it into tapes, reference can be made to the known Lenzing process (for stretching a film prior to cutting into tapes) and the Iso process (for cutting a film into tapes and stretching the formed tapes).

As a preferred embodiment thus stretched tapes are provided which are preferably in stretched, i.e. oriented, form, preferably in uniaxially oriented form.

Heat may typically be applied during the stretching, e.g. during in line stretching. The stretching ratio can be determined e.g. by the speed ratio of the godet rolls before and after the heating means in a manner known in the art. As also well known, the stretch and heat setting ratios can be optimized and adapted depending on the demands of the end application. As heating means e.g. an oven or a hot water bath can be used at temperatures typically between 90° C. and 130° C. or 90-99° C., respectively. Accordingly, the tapes preparation process preferably comprises a step of stretching tapes cut from a film, or of stretching film prior to cutting into tapes, whereby the stretching is preferably effected in the machine direction (MD) in a draw ratio of at least 1:2, preferably at least 1:3, preferably at least 1:5, preferably at least 1:7. A preferable tapes preparation process thus comprises a step of extruding a film which is optionally stretched, preferably in MD, at least 3 times its original length and subsequently cut to tapes, or which film is first cut to tapes that are optionally stretched, preferably in MD, at least 3 times their original length.

More preferably, extruded tapes cut from a film or a film prior to cutting into tapes is/are stretched 3 to 20 times, preferably 5 to 17 times, preferably 7 to 15 times, preferably 10 to 12 times, for example around 12 times its/their original length in the MD. The expressions "stretching 3 times its/their original length" and "drawn down to 3 times its/their original length" mean the same and can also be expressed as a "stretch ratio of at least 1:3" and, respectively, "draw ratio of at least 1:3", wherein "1" represents the original length of the film and "3" denotes that it has been stretched/drawn down to 3 times that original length.

The fibres, tapes, yarns, staple fibres and continuous filaments produced in accordance with the present invention are characterized by the improved tenacity with respect to the prior art fibres, tapes, yarns, staple fibres and continuous filaments. They are also characterized by improved elongational properties. In particular, the fibres, tapes, yarns, staple fibres and continuous filaments of the present invention are characterized by an improved tenacity in combination with improved elongational properties. The fibres, tapes, yarns, staple fibres and continuous filaments of the present invention are characterized by a maximum tenacity of 45 cN/tex or higher and an elongation at break of 60% or more at a draw ratio of 2, or even of 65 or more, in order to be well suited for high-tenacity fibres and nonwovens.

The improved properties of the fibres, tapes, yarns, staple fibres and continuous filaments can be translated into equally improved properties of the nonwovens produced with the fibres and yarns of the present invention. Thus, the nonwovens according to the present invention are characterized by improved tenacity. They are also characterized by improved elongational properties. In particular, they are characterized by the combination of improved tenacity and improved elongational properties.

Composites may be formed from two or more nonwovens, of which at least one is made in accordance with the present invention. Such composites may, for example, comprise further nonwovens, such as spunbond nonwovens or melt blown nonwovens or staple fibre nonwovens different from the ones of the present invention.

The tensile factor of a drawn article, such as a fibre, is known to the person skilled in the art. A definition of the tensile factor is given on page 733 of the "Encyclopedic Dictionary of Polymers" by Jan W. Gooch, second edition, ISBN 978-1-4419-6246-1, published in 2011. According to this definition, the tensile factor $TxE^{1\over 2}$ describes the tenacity elongation exchange relationship for a large number of manufactured fibre systems. The same definition is used in the present application. In a preferred embodiment of the invention, the drawn article has a tensile factor K of at least 40 g/denier, wherein the tensile factor is determined by formula (2):

$$K = Ten \times Elong^{1/2} \quad (2)$$

wherein Ten is the maximum tenacity (in g/den) and Elong is elongation at break (in %), and wherein Ten and Elong are both determined on a Lenzing Vibrodyn according to norm ISO 5079:1995 with a testing speed of 10 mm/min at 23° C. and gauge length of 10 mm.

It is noted that the tensile factor is calculated from tenacity (or tensile strength) expressed in grams-force/denier. When the tenacity is expressed in centiNewton/tex (cN/tex), the following conversion factor is to be applied: [cN/tex]× 0.1132=[g/d]

Test Methods

The melt flow index (MFI) of the polypropylene or polypropylene composition is determined according to ISO 1133 at 230° C. under a load of 2.16 kg.

Molecular weights are determined by Size Exclusion Chromatography (SEC) at high temperature (145° C.). A 10 mg syndiotactic polypropylene sample is dissolved at 160° C. in 10 mL of trichlorobenzene (technical grade) for 1 hour. Analytical conditions for the GPC-IR from Polymer Char are:

Injection volume: +/− 0.4 mL;
Automatic sample preparation and injector temperature: 160° C.;
Column temperature: 145° C.;
Detector temperature: 160° C.;
Column set: 2 Shodex AT-806MS and 1 Styragel HT6E;
Flow rate: 1 mL/min;
Detector: IR5 Infrared detector (2800-3000 cm$^{-1}$);
Calibration: Narrow standards of polystyrene (commercially available);
Calculation for polypropylene: Based on Mark-Houwink relation ($\log_{10}(M_{PP})=\log_{10}(M_{PS})-0.25323$); cut off on the low molecular weight end at $M_{PP}=1000$;

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The molecular weight distribution (MWD) is then calculated as Mw/Mn.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well known to the skilled person and include for example sufficient relaxation time etc. In practice, the intensity of a signal is obtained from its integral, i.e. the corresponding area. The data is acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/− 3000 Hz). The sample is prepared by dissolving a sufficient amount of polymer in 1,2,4-trichlorobenzene (TCB, 99%, spectroscopic grade) at 130° C. and occasional agitation to homogenise the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 mg to 600 mg of polymer is dissolved in 2.0 mL of TCB, followed by addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The isotacticity is determined by $^{13}$C-NMR analysis on the total polymer. In the spectral region of the methyl groups, the signals corresponding to the pentads mmmm, mmmr, mmrr and mrrm are assigned using published data, for example, A. Razavi, Macromol. Symp., vol. 89, pages 345-367. Only the pentads mmmm, mmmr, mmrr and mrrm are taken into consideration due to the weak intensity of the signals corresponding to the remaining pentads. For the signal relating to the mmrr pentad, a correction is performed for its overlap with a methyl signal related to 2,1-insertions. The percentage of mmmm pentads is then calculated according to % mmmm=AREA$_{mmmm}$/(AREA$_{mmmm}$+AREA$_{mmmr}$+AREA$_{mmrr}$+AREA$_{mrrm}$)×100

The comonomer content of a polypropylene is determined by $^{13}$C-NMR analysis of pellets according to the method described by G. J. Ray et al. in Macromolecules, vol. 10, n° 4, 1977, p. 773-778.

Melting temperatures $T_m$ were determined according to ISO 3146 on a DSC Q2000 instrument by TA Instruments. To erase the thermal history the samples are first heated to 200° C. and kept at 200° C. for a period of 3 minutes. The reported melting temperatures $T_{melt}$ are then determined with heating and cooling rates of 20° C./min.

Xylene soluble fraction (XS) is determined in accordance with ASTM D542-98.

Drawn article tenacity and elongation were measured on a Lenzing Vibrodyn according to norm ISO 5079:1995 with a testing speed of 10 mm/min at 23° C. and gauge length of 10 mm.

The following non-limiting examples illustrate the invention.

EXAMPLES

The advantages of the polypropylene of the invention over those of the prior art are illustrated by the following examples.

In all the examples the catalyst was a supported catalyst prepared in accordance to WO2011107560, WO2012001160 or WO2012020145, of the formula: $(C_6H_{11})(CH_3)Si(2\text{-Me-}4\text{-}(4'tBuPh)Ind)_2ZrCl_2$.

Example 1

Polypropylene homopolymers have been produced at different melt flow index using a metallocene catalyst according to the inventive process.

The properties obtained on the polymers (E1-E3) are given in the below table and are compared to Ziegler-Natta produced polypropylene (CE1-CE3) given as comparative examples. The comparative polypropylenes CE1, CE2 and CE3 are commercially available at TOTAL under the trade name PPH 3060, PPH 4060 ad PPH 4069 respectively.

The resin properties have been reported in table 1.

TABLE 1

| | PPH polypropylenes properties: | | | | | | |
|---|---|---|---|---|---|---|---|
| | unit | E1 | E2 | E3 | CE1 | CE2 | CE3 |
| MFI | g/10 min | 1.65 | 2.93 | 4.04 | 1.8 | 3.3 | 4.3 |
| Mn | kDa | 125 | 107 | 97 | 65 | 44 | 55 |
| Mw | kDa | 343 | 290 | 261 | 437 | 394 | 330 |
| Mz | kDa | 650 | 544 | 487 | 1883 | 1899 | 1096 |
| Mw/Mn | — | 2.7 | 2.7 | 2.7 | 6.7 | 9 | 6 |
| Xylene soluble | % | 0.41 | 0.44 | 0.21 | 2.75 | 3.56 | 1.57 |
| Melting temperature | ° C. | 150.3 | 150.1 | 150.0 | 159.6 | 160.4 | 161.1 |
| Crystallisation temperature | ° C. | 111.0 | 111.0 | 111.4 | 112.1 | 119.9 | 113.9 |

The inventive polypropylenes show a narrower molecular weight distribution (Mw/Mn), a lower weight average molecular weight, a lower xylene soluble fraction and a lower melting temperature than the comparative polypropylene at similar MFI.

Example 2

The properties of both the inventive and comparative resins have been assessed in tape extrusion on a pilot line. Bobbins with different stretching ratio (5, 7 and DR_max) have been produced at a constant titre of 400 dtex. The line speed was 35 m/min and 0.5 kg/h.

The tensile properties have been measured and reported in table 2.

TABLE 2

| | | | | | | Tensile test | | Tensile |
|---|---|---|---|---|---|---|---|---|
| | | | | Draw | | | | |
| Material | MFI g/10 min | Spinpump RPM | T° C. | ratio D/R | Fibre titer dtex | Tenacity cN/tex | Elongation % | factor K g/den |
| E1 | 1.65 | 4.5 | 280 | 5.0 | 405 | 48.6 | 104 | 56 |
| | | | | 7.0 | 430 | 54.1 | 64 | 49 |
| | | | | 12.0 | 388 | 66.3 | 34 | 44 |

TABLE 2-continued

<table>
<tr><th rowspan="3">Material</th><th colspan="7">Tensile properties</th></tr>
<tr><th rowspan="2">MFI g/10 min</th><th rowspan="2">Spinpump RPM</th><th rowspan="2">T° C. ° C.</th><th>Draw</th><th colspan="3">Tensile test</th><th>Tensile</th></tr>
<tr><th>ratio D/R</th><th>Fibre titer dtex</th><th>Tenacity cN/tex</th><th>Elongation %</th><th>factor K g/den</th></tr>
<tr><td>E2</td><td>2.93</td><td>3.7</td><td>260</td><td>5.0</td><td>346</td><td>48.3</td><td>67</td><td>45</td></tr>
<tr><td></td><td></td><td></td><td></td><td>10.0</td><td>296</td><td>63.1</td><td>33</td><td>41</td></tr>
<tr><td>E3</td><td>4.04</td><td>3.2</td><td>250</td><td>5.0</td><td>376</td><td>47</td><td>70</td><td>45</td></tr>
<tr><td></td><td></td><td></td><td></td><td>7.0</td><td>400</td><td>50</td><td>50</td><td>40</td></tr>
<tr><td></td><td></td><td></td><td></td><td>10.0</td><td>390</td><td>65</td><td>38</td><td>45</td></tr>
<tr><td>CE1</td><td>1.8</td><td>5.4</td><td>270</td><td>5.0</td><td>393</td><td>48.2</td><td>26</td><td>28</td></tr>
<tr><td></td><td></td><td></td><td></td><td>7.0</td><td>425</td><td>60</td><td>20</td><td>30</td></tr>
<tr><td></td><td></td><td></td><td></td><td>11.3</td><td>403</td><td>67.7</td><td>10</td><td>24</td></tr>
<tr><td>CE2</td><td>3.3</td><td>3.9</td><td>260</td><td>7.0</td><td>388</td><td>49.2</td><td>47</td><td>38</td></tr>
<tr><td></td><td></td><td></td><td></td><td>11.3</td><td>422</td><td>58.3</td><td>30</td><td>36</td></tr>
<tr><td>CE3</td><td>4.3</td><td>3.8</td><td>250</td><td>7.0</td><td>406</td><td>48.6</td><td>42</td><td>36</td></tr>
<tr><td></td><td></td><td></td><td></td><td>12.06</td><td>398</td><td>61.6</td><td>26</td><td>36</td></tr>
</table>

An example of calculation of the tensile factor K is given for E1 at draw ratio 5:

$$K = \text{tenacity in } g/d \times \text{elongation}^{1/2} = (48.6 \times 0.1132) \times 104^{1/2} = 56.10, \text{ that was rounded to 56.}$$

From the results, it can be observed that the tapes produced from metallocene-catalyzed polypropylene show better elongational properties than the ones produced by a Ziegler-Natta catalyzed polypropylene.

Example 3

The activity of the preferred metallocene catalyst used in accordance to the process of the invention, $(C_6H_{11})(CH_3)Si(2\text{-Me-4-}(4'tBuPh)Ind)_2ZrCl_2$, was evaluated and compared to the activity of another metallocene catalyst $Me_2Si(2\text{-Me-4-PhInd})_2ZrCl_2$ used in prior art. Polypropylene homopolymer of MFI below 5 g/10 min was produced in a double loop reactor. The polymerization temperature was 70° C., the co-activator was TiBAl. $(C_6H_{11})(CH_3)Si(2\text{-Me-4-}(4'tBuPh)Ind)_2ZrCl_2$ showed an activity of 21775 g/g/h whereas the activity showed by $Me_2Si(2\text{-Me-4-PhInd})_2ZrCl_2$ was 11346 g/g/h. As the catalyst according to the invention showed an activity that is twice the activity of the other catalyst, the process according to the invention is cost-effective.

Example 4

The properties of the inventive resin has been assessed in Continuous Filaments Process. It concerns a long-spin line with take-up godet followed by 3 pairs of godets, followed by the texturation, a relaxation godet and the winder. Each pair consists of 1 godet with heat- and motor control and one small-diameter, non-controlled free running godet.

Godet Temperatures for E3: 50, 120 and 145° C.

The line has 2 small extruders each connected to 1 die plate. A die plates with 24 round holes of 0.65 mm diameter and L/D=4.5 was selected for the trail. Both extruders were used to target 48×4.9 dTex/fil.

The tensile properties have been measured and reported in table 3.

TABLE 3:

<table>
<tr><th rowspan="3">Material</th><th colspan="7">Tensile properties</th></tr>
<tr><th rowspan="2">MFI g/10 min</th><th rowspan="2">Spinpump RPM</th><th rowspan="2">T° C. ° C.</th><th>Draw</th><th>Fiber</th><th colspan="2">Tensile test</th><th>Tensile</th></tr>
<tr><th>ratio D/R</th><th>titer dtex</th><th>Tenacity cN/tex</th><th>Elongation %</th><th>factor K g/den</th></tr>
<tr><td>E3</td><td>4.04</td><td>13/14</td><td>280</td><td>2.0</td><td>226</td><td>52</td><td>52</td><td>42</td></tr>
</table>

The invention claimed is:

1. A drawn article comprising a polypropylene wherein:
   the polypropylene has a melt flow index in the range from 1.5 to 4.5 g/10 min as determined according to ISO 1133, condition L, at 230° C. with a load of 2.16 kg;
   a xylene soluble fraction of at most 0.8 wt %, relative to the total weight of the polypropylene as determined in accordance with ASTM D542-98;
   a molecular weight distribution Mw/Mn ranging from 2.0 to 2.9; and
   a melting temperature Tm of at most 155° C. as determined according to ISO 3146;
   wherein the drawn article is selected from a fibre, a yarn, a tape, a staple fibre, or a continuous filament; and
   wherein the drawn article has a tenacity of at least 45 cN/tex as determined on a Lenzing Vibrodyn according to norm ISO 5079:1995 with a testing speed of 10 mm/min at 23° C. and gauge length of 10 mm.

2. The drawn article according to claim 1, wherein the polypropylene is a homopolymer of propylene.

3. The drawn article according to claim 1, wherein the polypropylene has a xylene soluble fraction of from 0.5 to 0.8 wt %, relative to the total weight of the polypropylene as determined in accordance with ASTM D542-98.

4. The drawn article according to claim 1, wherein the polypropylene has a molecular weight distribution Mw/Mn of at most 2.7.

5. The drawn article according to claim 1, wherein the polypropylene has a melting temperature of at most 153° C. as determined according to ISO 3146.

6. The drawn article according to claim 1, wherein the article is drawn at a draw ratio ranging from 2 to 12.

7. The drawn article according to claim 1, wherein the article exhibits a tensile factor K of at least 40 g/denier, wherein the tensile factor is determined by formula (2):

$$K = \text{Ten} \times \text{Elong}^{1/2} \qquad (2)$$

wherein the Ten is the tenacity at max expressed in g/den, and Elong is elongation at max expressed in %, and wherein Ten and Elong are both determined on a Lenzing Vibrodyn according to norm ISO 5079:1995 with a testing speed of 10 mm/min at 23° C. and gauge length of 10 mm.

8. The drawn article according to claim 1, wherein the polypropylene is produced by polymerization of propylene monomer and one or more optional comonomers in presence of a metallocene catalyst of the formula:

$$(\text{Ind})_2 R^1 M Q_2 \qquad (1)$$

wherein: each Ind is the same and is a substituted or unsubstituted indenyl group;

$R^1$ is a structural bridge imparting stereorigidity to the component and is selected from $-(CR^2R^3)_p-$ or $-(SiR^2R^3)_p-$ with p=1 or 2;

$R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;

$R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;

M is selected from Ti, Zr, or Hf; and

Q is an hydrocarbyl radical such as an alkyl, aryl, alkenyl, alkylaryl, or arylalkyl radical having 1-20 carbon atoms or is a halogen.

9. A nonwoven or woven comprising the drawn article according to claim 1.

10. A process for the production of a drawn article according to claim 1, wherein the process comprises:
(a) producing a polypropylene by polymerization of propylene and one or more optional comonomers in presence of a single-site catalyst of the following formula:

$$(\text{Ind})_2 R^1 M Q_2 \qquad (1)$$

wherein: each Ind is the same and is a substituted or unsubstituted indenyl group;

$R^1$ is a structural bridge imparting stereorigidity to the component and is selected from $-(CR^2R^3)_p-$ or $-(SiR^2R^3)_p-$ with p=1 or 2;

$R^2$ is selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;

$R^3$ is selected from the group consisting of hydrogen, $C_1$-$C_{10}$ alkyl, $C_5$-$C_7$ cycloalkyl, $C_5$-$C_7$ cyclocarbyl, $C_6$-$C_{15}$ aryl, alkylaryl with $C_1$-$C_{10}$ alkyl and $C_6$-$C_{15}$ aryl, or any two neighbouring R that may form a cyclic saturated or non-saturated $C_4$-$C_{10}$ ring;

M is selected from Ti, Zr, or Hf; and Q is an hydrocarbyl radical such as an alkyl, aryl, alkenyl, alkylaryl, or arylalkyl radical having 1-20 carbon atoms or is a halogen;

(b) extruding the polypropylene produced in step (a) to form an extruded article and cooling the extruded article, wherein the extruded article is selected from a fibre, a yarn, a tape, a staple fibre, or a continuous filament; and (c) drawing the extruded article of step (b) to form the drawn article.

11. The process of claim 10, wherein the catalyst is $(C_6H_{11})(CH_3)Si(2\text{-Me-4-}(4'\text{BuPh})\text{Ind})_2\text{ZrCl}_2$.

12. The process of claim 10, wherein the drawing is conducted at a draw ratio ranging from 2 to 12, wherein the draw ratio comprises:
a draw ratio ranging from 2 to 7 for a drawn article selected from fibre, yarn, continuous filament and tape.

13. The process of claim 10, wherein the polymerization reaction of step (a) is performed in presence of one or more co-activators being a trialkyl aluminium selected from Tri-Ethyl Aluminum (TEAL), Tri-iso-Butyl Aluminum (TIBAL), Tri-Methyl Aluminum (TMA), and Methyl Methyl-Ethyl Aluminum (MMEAL).

14. The process of claim 10, further comprising the step of (d) annealing the drawn article obtained in step (c).

15. The drawn article according to claim 1, wherein the polypropylene has a xylene soluble fraction of at most 0.6 wt %, relative to the total weight of the polypropylene as determined in accordance with ASTM D542-98.

16. The drawn article according to claim 1, wherein the drawn article is a tape.

17. The drawn article according to claim 1, wherein the polypropylene has a xylene soluble fraction of from 0.5 to 0.6 wt %, relative to the total weight of the polypropylene as determined in accordance with ASTM D542-98.

18. The process of claim 10, wherein the drawing is conducted at a draw ratio ranging from 2 to 12, wherein the draw ratio comprises:
a draw ratio ranging from 2 to 4 for a drawn article being a staple fibre produced according to a short spin process.

19. The drawn article according to claim 1, wherein the polypropylene has a xylene soluble fraction of at most 0.5 wt %, relative to the total weight of the polypropylene as determined in accordance with ASTM D542-98.

* * * * *

UNITED STATES PATENT AND TRADEMARK OFFICE
CERTIFICATE OF CORRECTION

PATENT NO. : 11,845,816 B2
APPLICATION NO. : 16/614411
DATED : December 19, 2023
INVENTOR(S) : Manel Perrot and Pieter Geeurickx It is certified that error appears in the above-identified patent and that said Letters Patent is hereby corrected as shown below:

In the Claims

In Claim 11, Column 22, Line 21, please replace "(4'BuPh)" with --(4'tBuPh)-- therefore.

Signed and Sealed this
Sixth Day of February, 2024

Katherine Kelly Vidal
*Director of the United States Patent and Trademark Office*